United States Patent
Hughes (10) Patent No.: US 7,844,758 B1
(45) Date of Patent: Nov. 30, 2010

(54) DYNAMIC RESOURCE ALLOCATION SCHEME FOR EFFICIENT USE OF A QUEUE

(75) Inventor: William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1820 days.

(21) Appl. No.: 10/464,395

(22) Filed: Jun. 18, 2003

(51) Int. Cl.
  *G06F 3/00* (2006.01)
(52) U.S. Cl. .............................. 710/39; 710/5; 710/33; 710/54; 710/55; 710/56
(58) Field of Classification Search ................. 710/147, 710/148, 170, 171, 172, 173, 5, 33, 39, 54, 710/55, 56
  See application file for complete search history.

(56) References Cited

U.S. PATENT DOCUMENTS

| | | | |
|---|---|---|---|
| 5,561,785 A * | 10/1996 | Blandy et al. ................ | 711/170 |
| 5,675,793 A | 10/1997 | Crick et al. | |
| 5,682,553 A * | 10/1997 | Osborne ....................... | 710/56 |
| 5,887,168 A * | 3/1999 | Bahls et al. .................. | 719/314 |
| 5,963,963 A | 10/1999 | Schmuck et al. | |
| 5,964,859 A | 10/1999 | Steinbach et al. | |
| 6,092,127 A | 7/2000 | Tausheck | |
| 6,240,066 B1 | 5/2001 | Nagarajan et al. | |
| 6,286,092 B1 * | 9/2001 | Frank et al. .................. | 711/207 |
| 6,505,285 B1 * | 1/2003 | Rabinovici et al. .......... | 711/170 |
| 6,640,290 B1 * | 10/2003 | Forin et al. .................. | 711/156 |
| 7,032,222 B1 * | 4/2006 | Karp et al. ................... | 718/104 |
| 7,213,087 B1 * | 5/2007 | Bertone et al. ................ | 710/56 |
| 2002/0174316 A1 * | 11/2002 | Dale et al. ................... | 711/170 |

* cited by examiner

*Primary Examiner*—Tariq Hafiz
*Assistant Examiner*—Jasjit S Vidwan
(74) *Attorney, Agent, or Firm*—Rory D. Rankin; Meyertons, Hood, Kivlin, Kowert & Goetzel, P.C.

(57) ABSTRACT

A method and mechanism for managing requests to a resource. A request queue receives requests from multiple requestors and maintains a status for each requestor indicating how many requests the requestor has permission to issue. Upon initialization, the request queue allots to each requestor a predetermined number of "hard" entries, and a predetermined number of "free" entries. Un-allotted entries are part of a free pool of entries. If a requestor has an available entry, the requestor may submit a request to the request queue. After receiving a request, the request queue may allot a free pool entry to the requestor if the free pool currently has entries available. Upon de-allocation of a queue entry, if the entry corresponds to a hard entry, then the hard entry is re-allotted to the same requestor. If the entry is a free entry, the entry is made available and a free pool counter is incremented.

25 Claims, 5 Drawing Sheets

DYNAMIC RESOURCE ALLOCATION SCHEME FOR EFFICIENT USE OF A QUEUE

BACKGROUND OF THE INVENTION

1. Field of the Invention

This invention is related to the field of processors and, more particularly, efficient use and resource allocation for a queue.

2. Description of the Related Art

In a computing system, it is sometimes advantageous for multiple sources of transactions to share a common queuing structure which services those transactions. For example, in a distributed memory system a single "request queue" may be used to service requests directed to system memory from a CPU and from one or more I/O devices. For those devices which implement multiple CPU cores on a single chip, several CPU cores plus a chain of I/O devices may all share a single request queue. The request queue may generally be responsible for accepting an incoming memory request (e.g., a memory read or write), performing actions necessary for completing the request, and returning appropriate responses back to the requestors as necessary.

In large distributed memory multiprocessor systems, the actions necessary to complete memory requests may involve several steps. For example, actions which are necessary may include sending the request to a target, monitoring responses from other entities which may have a copy of the requested data and the response from memory, sending a "source done" indication when the operation is complete, and sending a response back to the requestor. Because the queue may also be required to handle cache block requests, writes, interrupts and system management requests, the complexity associated with the queue can be significant and each queue entry may require significant area to implement. Consequently, limiting the total number of queue entries may be required. With a limited number of queue entries available, an efficient method of allocating and managing the available queue resources is desired.

SUMMARY OF THE INVENTION

The problems outlined above are in large part solved by a method and mechanism for managing resource requests as described herein.

In one embodiment, a request queue is configured to receive requests from multiple requestors. The request queue is further configured to maintain a status for each requestor which indicates how many requests the corresponding requestor currently has permission to make to the request queue. The request queue includes a plurality of entries for storing received requests. Upon system initialization, the request queue allots to each requestor a number of "hard" entries, and a number of "free" entries. Un-allotted entries are considered part of a free pool of entries and a count of the number of the free pool entries is maintained. In one embodiment, the combined number of hard, free, and un-allotted entries is equal to the number of entries in the queue. In other embodiments, the combined number of entries may not equal the number of entries in the queue. If a requestor has an available hard or free entry, the requestor may submit a request to the request queue. Upon receipt of a request, the request queue notes the identification of the requestor and the type of request (hard or free) being made. An entry from the queue is then allocated for the received request. In one embodiment, after receiving a request, the request queue may allot a free pool entry to the requestor if the free pool currently has entries available. Upon de-allocation of a queue entry, a determination is made as to which requestor made the request corresponding to the entry being de-allocated and the type of entry corresponding to the original request. If the entry corresponds to a hard entry, then the hard entry is re-allotted to the same requestor. Alternatively, if the entry is a free entry, the entry is made available and the free pool counter is incremented.

Other objects and advantages of the invention will become apparent upon reading the following detailed description and upon reference to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
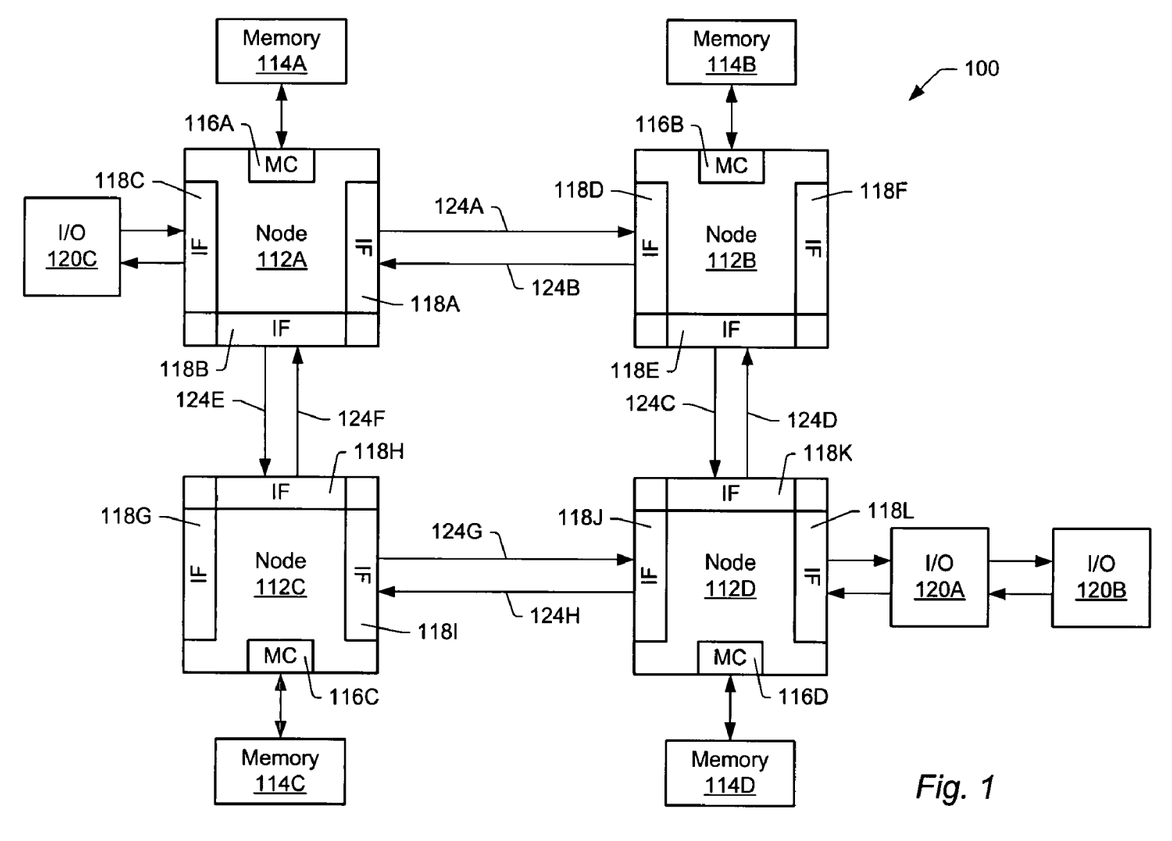
FIG. 1 is a block diagram of one embodiment of a computing system.

FIG. 1 illustrates one embodiment of a computing system 100. Other embodiments are possible and contemplated. In the embodiment of FIG. 1, computer system 100 includes processing nodes 112A, 1128, 112C, and 112D. Each processing node is coupled to a respective memory 114A-114D via a memory controller 116A-116D included within each respective processing node 112A-112D. Additionally, processing nodes 112A-112D include interface logic used to communicate between the processing nodes 112A-112D. For example, processing node 112A includes interface logic 118A for communicating with processing node 112B, interface logic 118B for communicating with processing node 112C, and a third interface logic 118C which is coupled to input/output (I/O) device 120C. Similarly, processing node 112B includes interface logic 118D, 118E, and 118F; processing node 112C includes interface logic 118G, 118H, and 118I; and processing node 112D includes interface logic 118J, 118K, and 118L. Processing node 112D is coupled to communicate with a plurality of I/O devices (e.g. devices 120A-120B in a daisy chain configuration) via interface logic 118L. Processing node 120A is coupled to communicate with I/O device 120C. Other processing nodes may communicate with other I/O devices in a similar fashion. Elements referred to herein with a particular reference number followed by a letter will be collectively referred to by the reference number alone. For example, nodes 112A-112D will be collectively referred to as nodes 112.

Processing nodes 112A-112D implement a packet-based link for inter-processing node communication. In the present embodiment, the link is implemented as sets of unidirectional lines (e.g. lines 124A are used to transmit packets from processing node 112A to processing node 112B and lines 124B are used to transmit packets from processing node 112B to processing node 112A). Other sets of lines 124C-124H are used to transmit packets between other processing nodes as illustrated in FIG. 1. Generally, each set of lines 124 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 112A to processing node 112D may pass through either processing node 112B or processing node 112C as shown in FIG. 1. Any suitable routing algorithm may be used. Other embodiments of computer system 100 may include more or fewer processing nodes then the embodiment shown in FIG. 1.

Processing nodes 112A-112D, in addition to a memory controller and interface logic, may include one or more processors. Broadly speaking, a processing node comprises at least one processor and may optionally include a memory controller for communicating with a memory and other logic as desired.

Memories 114A-114D may comprise any suitable memory devices. For example, a memory 114A-114D may comprise one or more RAMBUS DRAMs (RDRAMs), synchronous DRAMs (SDRAMs), static RAM, etc. The address space of computer system 100 is divided among memories 114A-114D. Each processing node 112A-112D may include a memory map used to determine which addresses are mapped to which memories 114A-114D, and hence to which processing node 112A-112D a memory request for a particular address should be routed. In one embodiment, the coherency point for an address within computer system 100 is the memory controller 116A-116D coupled to the memory storing bytes corresponding to the address. In other words, the memory controller 116A-116D is responsible for ensuring that each memory access to the corresponding memory 114A-114D occurs in a cache coherent fashion. Memory controllers 116A-116D may comprise control circuitry for interfacing to memories 114A-114D. Additionally, memory controllers 116A-116D may include request queues for queuing memory requests.

Generally, interface logic 118A-118L may comprise a variety of buffers for receiving packets from the link and for buffering packets to be transmitted upon the link. Computer system 100 may employ any suitable flow control mechanism for transmitting packets.

I/O devices 120A-120C may be any suitable I/O devices. For example, I/O devices 120 may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Figure 2:
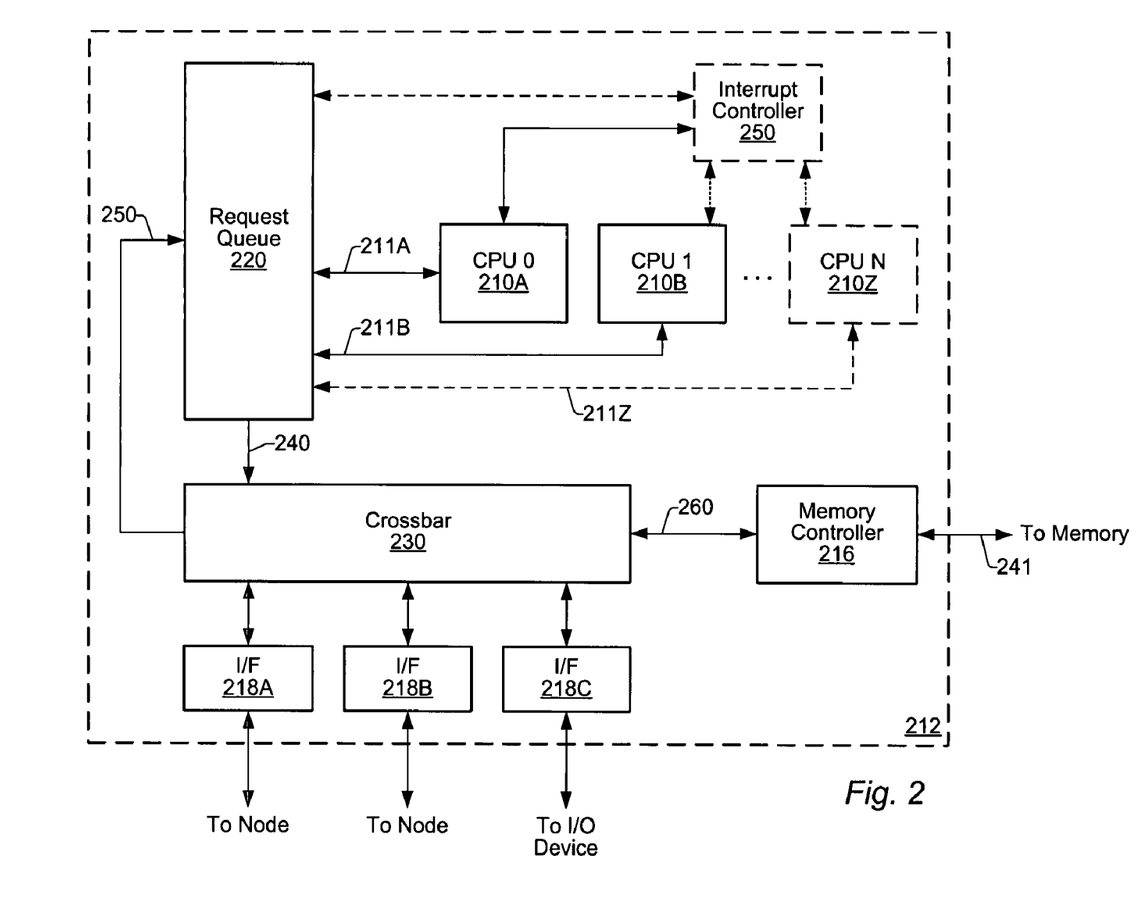
FIG. 2 is a block diagram of one embodiment of a processing node.

Turning now to FIG. 2, one embodiment of a node 212 which may be used in a system such as system 100 is shown. Node 212 includes processing units 210A and 210B, and optionally additional processors 210C, 210D, etc., coupled to request queue 220 via buses 211 and interrupt controller 250. Request queue 220 is coupled to crossbar 230 via bus 240. Also coupled to crossbar 230 are interfaces 218A-218C. Finally, crossbar 230 is coupled to request queue 220 via bus 250 and memory controller 216 via bus 260. While FIG. 2 illustrates node 212 as including multiple processors 210 and multiple interfaces 218, it is to be understood that alternate configurations are possible and are contemplated. For example, node 212 may include only a single processor and a single external interface 218.

In the embodiment shown in FIG. 2, each of processors 210 is configured to convey memory requests to memory controller 216 via request queue 220. Crossbar 230 is configured to receive commands and/or data from request queue 220 and interfaces 218 and route accordingly. Because node 212 is configured to manage requests for access to a locally coupled memory from multiple requestors, request queue 220 is configured to manage requests is such a manner that access to memory is maintained for all requestors, while also preventing starvation.

Figure 3:
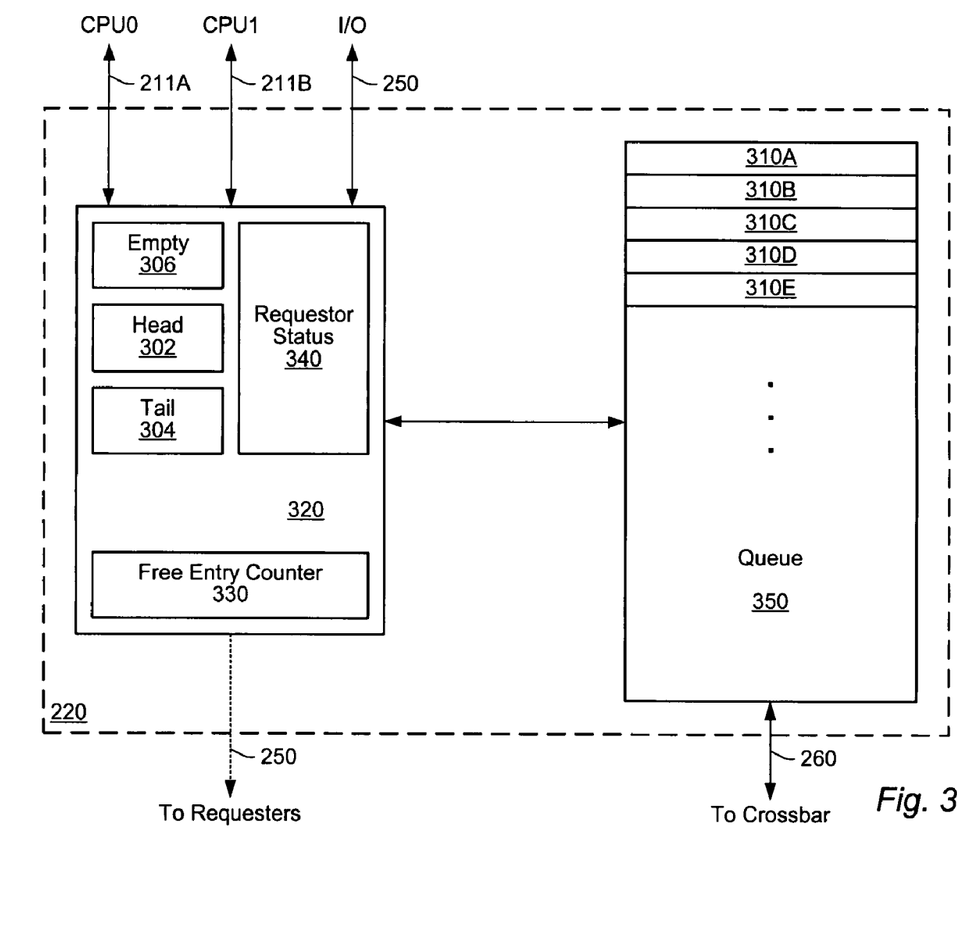
FIG. 3 is a block diagram illustrating one embodiment of a request queue as illustrated in FIG. 2.

One embodiment of request queue 220 is illustrated in FIG. 3. Generally speaking, request queue 220 is configured to service requests on a first-come-first-serve basis. However, alternative embodiments of queue 220 may be configured to reorder requests based upon particular priorities. In addition, queue 220 may be configured to service more than one request at a time. Still further, queue 220 may be configured as a circular buffer, shifting and collapsing queue, fall-through FIFO, or others. Numerous alternative embodiments of queue 220 are possible and are contemplated. As shown in FIG. 3, request queue 220 includes a control circuit 320 and queue 350. Control circuit 320 receives commands and data from CPU0 211A, CPU1 211B, and external I/O device or remote node via bus 250. Queue 350 is a first-in-first-out (FIFO) structure which includes multiple entries 310 configured to store commands and/or data received by request queue 220. Control circuit 320 includes queue empty indicator 306, queue head pointer 302 and queue tail pointer 304, requestor status 340, and free entry counter 330.

Head 302 and tail 304 pointers are configured to keep track of entries 310 which are validly occupied. Generally, other than when queue 350 is empty, head 302 points to the oldest valid entry in the queue and tail 304 points to the newest valid entry in the queue. Upon reset, control circuit 320 sets queue empty indicator 306 to indicate that queue 350 is empty, and head 302 and tail 304 pointers are set to point, or otherwise indicate, a same entry among entries 310. When a new request is received, the entry 310 currently indicated by the tail 304 is allocated for the received request, and the tail 304 pointer is incremented to point to the next available entry. Conversely, when a valid entry 310 in queue is de-allocated, the head 302 pointer is incremented to point to the next entry in the queue 350. It will be appreciated, that the FIFO structure described in FIG. 3 is intended to be exemplary only, and that structures other than the FIFO queue 350 and corresponding head/tail/empty indicators may be utilized as well to achieve the ordering of received requests. For example, other structures may not be configured to operate with head/tail pointers, but may be associatively searched to identify the relative age of an entry. Further, other embodiments may weight requests with relative priorities. In such an embodiment, a request with a higher priority may be serviced prior to an earlier received request with a lower priority, rather than in a strict FIFO order.

In one embodiment, control circuit 320 is configured to support a "coupon" based request system wherein a requestor may not make a request unless that requestor currently has a queue entry 310 available for the request. Requestor status 340 is configured to identify a number of queue entries 310 which are available to each requestor which may make requests within, or to, node 212. A queue entry which is available for use by a particular requestor may be considered a "coupon" or a permission to make a request. For example, circuit 320 may be programmable to indicate that request queue 220 may receive requests from N requestors. Each of the N requestors may further be identified by a requestor ID which accompanies, or is otherwise associated, with each received request. For example, in one embodiment, the requestors may include two local processors CPU0 and CPU1, and one or more I/O devices which are coupled via an interface 218C. In addition, requests may be received from other nodes via interfaces 218A and 218B. Requestor status 340 may then include a status entry for each requestor.

In one embodiment, requestor status 340 categorizes entries which are available to requestors as either "hard" or "free". Generally, the number of hard entries allotted to each requestor is programmable and may be established at reset or during system configuration. On the other hand, the number of free entries allotted to a particular requestor may be dynamic and may be dependent upon the number of un-allotted queue entries available at any given time. When it is said that a particular type of entry is allotted to a requestor, that requestor has permission to make a request of that type. During operation, each requestor may only submit a request to request queue 220 if that requestor currently has an available hard or free entry (a "coupon"). Each request submitted by a requestor includes an indication of both the identity of the requestor, and the type of request (hard or free) being made. Requestor status 340 then indicates that the requestor has used the corresponding hard or free entry. In one embodiment, requestor status 340 may keep a count of hard and free entries, respectively, for each requestor, and decrement the count when a request is made. Additionally, request queue 220 conveys indications to the requestor indicating both the original allotment of entries, and any subsequent allotment of entries—including both number of entries being allotted and type.

In addition to the above, when an entry 310 in queue 350 is allocated for a request corresponding to a particular requestor, the data in the entry 310 which is allocated may indicate both the requestor and the type of entry request, hard or free, which was utilized in making the request. When an allocated entry 310 is subsequently de-allocated, the entry is then made available as either a hard entry or a free entry. If the de-allocated entry was a hard entry, the entry is re-allotted to the requestor which owns the de-allocated hard entry. Alternatively, if the de-allocated entry was, a free entry, the entry is added to a "pool" of free entries. In this manner, hard entries are always re-allotted to the requesting entity which owns the hard entry. By assigning hard entries in this way, no requestor may be starved of queue resources. Additionally, differing numbers of hard entries may be allotted to different requestors depending on the need for resources by each requestor.

Circuit 320 is configured to allot zero or more hard entries 310 to each of the requestors. The number of hard entries allotted to each requestor may be programmable and is generally set upon reset. In alternative embodiments, the number of hard entries allotted to requestors may be responsive to system traffic patterns, memory access patterns, or other criteria, and may change in response to detecting certain condition. In addition to the hard entries discussed above, free entries may be allotted to requestors as well. Typically, queue 350 may include a fixed number of entries. Those entries which are not allotted as hard entries are considered free entries and may be allotted to requestors as desired. In the embodiment shown, free entry counter 330 keeps track of a number of free entries available for allotment to requestors. In addition, each requestor (not shown) may include an indication of hard and free entries which are currently allotted to the requestor. In one embodiment, each requestor may include two flip-flops, one representing available hard entries and the other indicating available free entries. In response to a signal from request queue 220, a flip-flop may be set to indicate an available entry. When a requestor uses an available entry to issue a request, the requestor may clear the corresponding flip-flop to indicate the corresponding entry is no longer available. Alternative embodiments may include larger sized counters for indicating available entries.

In one embodiment, at least one hard entry is allotted to each requestor. Accordingly, each requestor may be assured of access to request queue 220 resources and will not be starved. In addition, each requestor is allotted a single free entry. Those entries which remain un-allotted are considered to be part of a free pool of entries available to all requestors. Entries from the free pool may be allotted to a requestor according to a programmable algorithm. In one embodiment, when a requestor uses a free entry and the free entry counter 330 indicates there are free entries available in the pool, a new free entry may be allotted to the requestor. Consequently, busy requestors may take advantage of the free entry pool in order to maximize utilization of the queue 350. In one embodiment, requestors may favor using free entries over hard entries if a free entry is available.

Figure 4:
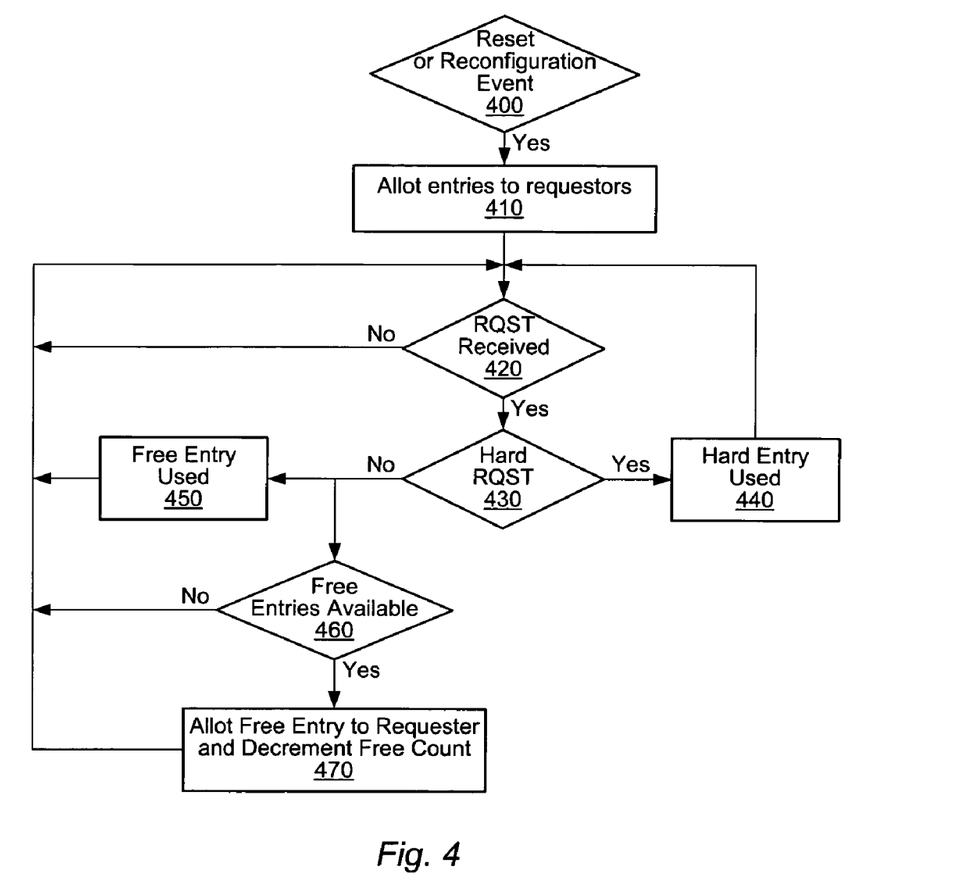
FIG. 4 illustrates one embodiment of a method of operating a request queue.

Turning now to FIG. 4, one embodiment of a method according to the above described embodiment is illustrated. As shown, in response to detecting a reset or some reconfiguration event (block 400), queue entries are allotted to requestors (block 410). Reconfiguration events may include detecting particular memory access patterns by requestors, reaching some predetermined threshold (e.g., a particular requestor requiring access to the queue more than a particular number of times in a set time period), or some other event. As described above, generally at least one hard entry is allotted to each requestor, along with one or more free entries. However, alternative embodiments may allot different numbers of entries based on anticipated, or observed, need. In response to detecting the receipt of a request (block 420), a determination is made (block 430) as to what type of request has been received.

If the received request corresponds to a hard entry, a queue entry is allocated for the request (block 440) and an indication of the requestor's ID and the type of request are associated with the allocated entry. In one embodiment, the entry itself may include the indication of the requestor ID and type of entry. However, other embodiments may store such indications separately. Alternatively, if the received request corresponds to a free entry, a queue entry is allocated (block 450) and the requestor's ID and type of request are stored. In addition, if the request corresponds to a free entry and a free entry is currently available (block 460), an entry is allotted (block 470) from the free pool the requestor from which the free entry request was received and the free pool counter is decremented. It is noted that the allocation of a free entry (block 450) and the determination as to whether additional free entries are available (block 460) may be performed concurrently. In an alternative embodiment, the determination (block 460) and allotment of a free entry (block 470) may also be performed concurrently with the allocation of a hard entry (block 440).

Figure 5:
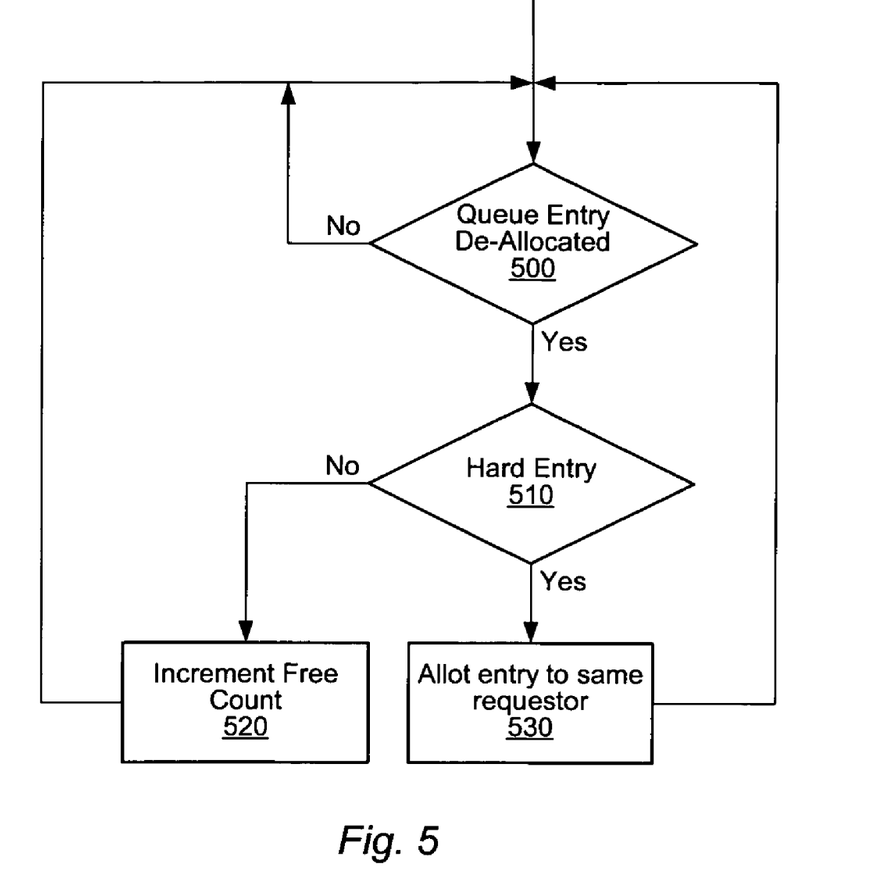
FIG. 5 illustrates one embodiment of a method of operating a request queue.

FIG. 5 illustrates one embodiment of a method illustrating de-allocation of a queue entry. In response to the de-allocation of a queue entry (block 500), a determination is made as to the type of entry being allocated (block 510). As described above, the entry itself may include an indication of the requestor and type of request corresponding to the entry, or the corresponding requestor and type of request may be stored separately. If the entry is a hard entry, the hard entry is allotted to the same requestor which originated the request corresponding to the de-allocated entry. If it is determined the entry is not a hard entry, the entry is returned to the free pool and the free pool counter is incremented.

Numerous variations and modifications will become apparent to those skilled in the art once the above disclosure is fully appreciated. It is intended that the following claims be interpreted to embrace all such variations and modifications.

What is claimed is:

1. An apparatus comprising:
    a buffer including a plurality of entries, wherein each of said entries is configured to store data corresponding to a request received from a requestor; and
    circuitry coupled to said buffer, wherein said circuitry is configured to:
        allot a first number of said entries to a first requestor and a second number of said entries to a second requestor, wherein said first number of entries and second number of entries are of a first type;
        allot a third number of said entries to said first requestor and a fourth number of said entries to said second requestor, wherein said third and fourth number of entries are of a second type; and
        allocate an entry of said entries in response to a received request;
        wherein said entries of said first type comprise hard entries which are always re-allotted to the requesting entity which owns the hard entry, and wherein said entries of said second type comprise free entries which are not owned by a particular entity;
    wherein when a given requestor of the first requestor and the second requestor has both hard entries and free entries available, when making a request for allocation of an entry the given requestor is configured to:
        choose whether a hard entry or a free entry is allocated responsive to a request; and
        convey a request which includes an indication as to whether a hard entry or a free entry is allocated.

2. The apparatus as recited in claim 1, wherein said circuitry is further configured to de-allocate entries of the buffer, and wherein in response to de-allocating a given entry of the buffer, said circuitry is configured to:
    retrieve an indication stored within the given entry which indicates whether the given entry was allocated in response to a request from a given requestor for allocation of a hard entry or a free entry; and
    utilize the retrieved indication to determine whether the given entry is allotted to the given requestor or the given entry is allotted to a pool of free entries.

3. The apparatus as recited in claim 1, wherein in response to receiving a given request from either said first requestor or said second requestor, said circuitry is further configured to:
    retrieve an indication included in the given request;
    allocate a hard entry responsive to determining the indication indicates a hard entry is to be allocated responsive to the given request; and
    allocate a free entry responsive to determining the indication indicates a free entry is to be allocated responsive to the given request.

4. The apparatus as recited in claim 3, wherein said circuitry further comprises a counter indicating a number of entries in said pool of free entries.

5. The apparatus as recited in claim 4, wherein said circuitry is configured to allot said first, second, third and fourth number of entries in response to either a system reset or in response to detecting a reconfiguration event.

6. The apparatus as recited in claim 4, wherein in response to receiving a request, said circuitry is configured to detect both the identification of the corresponding requestor and whether the type of request received corresponds to a hard entry or a free entry.

7. The apparatus as recited in claim 6, wherein said circuitry is configured to allocate an entry of said plurality of entries for said received request, and store a first indication corresponding to the allocated entry, wherein said first indication indicates said requestor identification and said request type.

8. The apparatus as recited in claim 7, wherein in response to receiving a request and detecting additional free entries are available in the free pool of entries, the circuitry is further configured to allot a free entry to the requestor which corresponds to the received request and decrement said counter.

9. The apparatus of claim 1, wherein said received request includes an indication provided by a requestor as to whether the received request corresponds to a hard request or a free request.

10. A processing node comprising:
    a processor;
    a first interface configured to receive requests from an I/O device coupled to said interface; and
    a request queue including a plurality of entries which are configured to store data corresponding to requests received from said processor and said I/O device, wherein said request queue is configured to:
        allot a first number of said entries to said processor and a second number of said entries to said I/O device, wherein said first number of entries and second number of entries are of a first type;
        allot a third number of said entries to said processor and a fourth number of entries to said I/O device, wherein said third and fourth number of entries are of a second type; and
        allocate an entry of said entries in response to a received request;
        wherein said entries of said first type comprise hard entries which are always re-allotted to the requesting entity which owns the hard entry, and wherein said entries of said second type comprise free entries which are not owned by a particular entity;
    wherein when a given requestor of said processor and said I/O device has both hard entries and free entries available, when making a request for allocation of an entry the given requestor is configured to:
        choose whether a hard entry or a free entry is allocated responsive to a request and
        convey a request which includes an indication as to whether a hard entry or a free entry is allocated.

11. The processing node as recited in claim 10, wherein said queue is further configured to de-allocate entries of the buffer, and wherein in response to de-allocating a given entry, said request queue is configured to:
    retrieve an indication stored within the given entry which indicates whether the given entry was allocated in response to a request from a given requestor for allocation of a hard entry or a free entry; and
    utilize the retrieved indication to determine whether the given entry is allotted to the given requestor or the given entry is allotted to a pool of free entries.

12. The processing node as recited in claim 10, wherein in response to receiving a given request from either said processor or said I/O device, said request queue is further configured to:
  retrieve an indication included in the given request;
  allocate a hard entry responsive to determining the indication indicates a hard entry is to be allocated responsive to the given request; and
  allocate a free entry responsive to determining the indication indicates a free entry is to be allocated responsive to the given request.

13. The processing node as recited in claim 12, wherein said circuitry further comprises a counter indicating a number of entries in said pool of free entries.

14. The processing node as recited in claim 13, wherein said circuitry is configured to allot said first, second, third and fourth number of entries in response to either a system reset or in response to detecting a reconfiguration event.

15. The processing node as recited in claim 13, wherein in response to receiving a request, said request queue is configured to detect both the identification of the corresponding requestor and whether the type of request received corresponds to a hard entry or a free entry.

16. The processing node as recited in claim 15, wherein said request queue is configured to allocate an entry of a plurality of entries for said received request, and store a first indication corresponding to the allocated entry, wherein said first indication indicates said requestor identification and said request type.

17. The processing node as recited in claim 10, wherein in response to receiving a request and detecting additional free entries are available in the free pool of entries, the queue is further configured to allot a free entry to the requestor which corresponds to the received request and decrement said counter.

18. A method for managing requests to a limited resource from a plurality of requestors, said method comprising:
  allotting a first number of entries of a plurality of entries of a buffer to a first requestor and a second number of said entries to a second requestor, wherein said first number of entries and second number of entries are of a first type;
  allotting a third number of said plurality of entries to said first requestor and a fourth number of entries to said second requestor, wherein said third and fourth number of entries are of a second type; and
  allocating an entry of said entries in response to receiving a request;
  wherein each entry of said plurality of entries is configured to store data corresponding to a request received from a requestor;
  wherein said entries of said first type comprise hard entries which are always re-allotted to the requesting entity which owns the hard entry, and wherein said entries of said second type comprise free entries which are not owned by a particular entity;
  wherein when a given requestor of the first requestor and the second requestor has both hard entries and free entries available, when making a request for allocation of an entry the method further comprises the given requestor:
    choosing by the given requestor whether a hard entry or a free entry is allocated responsive to a request; and
    conveying by the given requestor a request which includes an indication as to whether a hard entry or a free entry is allocated.

19. The method as recited in claim 18, wherein in response to de-allocating a given entry of the buffer, the method further comprises:
  retrieving an indication stored within the given entry which indicates whether the given entry was allocated in response to a request from a given requestor for allocation of a hard entry or a free entry; and
  utilizing the retrieved indication to determine whether the given entry is allotted to the given requestor or the given entry is allotted to a pool of free entries.

20. The method as recited in claim 18, wherein in response to receiving a given request from either said first requestor or said second requestor, the method further comprises:
  retrieving an indication included in the given request;
  allocating a hard entry responsive to determining the indication indicates a hard entry is to be allocated responsive to the given request; and
  allocating a free entry responsive to determining the indication indicates a free entry is to be allocated responsive to the given request.

21. The method as recited in claim 20, wherein said method further comprises maintaining a counter indicating a number of entries in said pool of free entries.

22. The method as recited in claim 21, wherein allotting said first, second, third and fourth number of entries is in response to either a system reset or in response to detecting a reconfiguration event.

23. The method as recited in claim 21, wherein in response to receiving a request, the method further comprises detecting both the identification of the corresponding requestor and detecting whether the type of request received corresponds to a hard entry or a free entry.

24. The method as recited in claim 23, wherein said method further comprises allocating an entry of said plurality of entries for said received request, and storing a first indication corresponding to the allocated entry, wherein said first indication indicates said requestor identification and said request type.

25. The method as recited in claim 18, wherein in response to receiving a request and detecting additional free entries are available in the free pool of entries, said method further comprises allotting a free entry to the requestor which corresponds to the received request and decrementing said counter.

* * * * *